United States Patent [19]
Rooijakkers

[11] Patent Number: 6,142,557
[45] Date of Patent: Nov. 7, 2000

[54] OPEN ROOF CONSTRUCTION FOR A VEHICLE

[75] Inventor: Alphonsus Theodorus Bernardus Rooijakkers, Nijmegen, Netherlands

[73] Assignee: Inalfa Industries B.V., Netherlands

[21] Appl. No.: 09/303,870

[22] Filed: May 3, 1999

[30] Foreign Application Priority Data

May 5, 1998 [NL] Netherlands ............. 1009066

[51] Int. Cl.[7] ........................................ B60J 7/00
[52] U.S. Cl. ............................................ 296/213
[58] Field of Search .......................... 296/213, 208

[56] References Cited

U.S. PATENT DOCUMENTS 5,718,472  2/1998  Otake et al. ............ 296/213 X

Primary Examiner—Dennis H. Pedder
Attorney, Agent, or Firm—Westman, Champlin & Kelly, P.A.; S. Koehler

[57] ABSTRACT

An open roof construction for a vehicle having an opening in its fixed roof comprises a stationary part to be secured to the roof, which is provided with guide rails on either side of the roof opening. An adjustable closing element supported by said stationary part can be adjusted by means of mechanisms guided in said guide rails between a closed position, in which it closes the roof opening, and an open position, in which it releases the roof opening, at least partially so. Water drain means comprise stationary water gutters, which extend parallel to the guide rails, and a movable water gutter, which is disposed under the rear edge of said closing element, at least in the closed position thereof. The ends of the movable water gutter, which are mounted on slides, debouch above the stationary water gutters. The slides are fitted with mounting covers, which each engage over the associated end of the movable water gutter, thus holding it in position on said slides.

10 Claims, 2 Drawing Sheets

OPEN ROOF CONSTRUCTION FOR A VEHICLE

BACKGROUND OF THE INVENTION

1. Field of the Invention

The invention relates to an open roof construction according to the preamble of claim 1.

2. Description of the Related Art

Such an open roof construction is known, for example from German Gebrauchsmuster 298 01 276.6. The movable water gutter and the associated slides of this known open roof construction are provided with co-acting elements, by means of which a snap connection between the two can be effected.

SUMMARY OF THE INVENTION

The object of the present invention is to further improve such an open roof construction.

In order to accomplish that objective, the open roof construction according to the invention is characterized in that said slides are fitted with mounting covers, which each engage over the associated end of the movable water gutter, thus holding it in position on said slides.

Since the slides are fitted with mounting covers which engage over the associated end of the water gutter, the water gutter itself may be a very simple part, for example a plastic or metal section member. The connecting and/or holding function is performed entirely or in large measure by parts of the slides.

Preferably, each mounting cover is hinged to the slides in one piece therewith via a hinge, as a result of which the slides and the mounting means can be formed as one unit, for example by means of an injection moulding technique.

It is advantageous if the hinge of each mounting cover extends transversely to the guide rails, preferably on the rear side of the water gutter. In this manner the hinge can take up the forces that are exerted on the water gutter, for example in those cases where the water gutter functions as a stop for a sun screen or the like.

The simplest way of securing the mounting cover to the water gutter is to connect each mounting cover to the associated slide by means of a snap connection on the side opposite the hinge.

Any tolerances can be readily compensated, due to the special configuration or retainment of the slide/mounting cover and/or the water gutter, as a result of which the slides are not impeded in their movement through the guide rails. It is for example possible to hold one end of the water gutter in position with respect to the associated slide, whilst the other end of said water gutter can freely slide in its longitudinal direction with respect to the other slide.

According to a very advantageous embodiment of the open roof construction according to the invention, each mounting cover extends beyond the respective end of the water gutter and comprises a water conducting wall. In this embodiment the water is completely conducted into the respective lateral stationary water gutter by the mounting cover, so that no water will be spilt at the transition from the movable water gutter to the respective stationary lateral water gutter, not even in the event of sudden movements of the vehicle.

The invention will be explained in more detail hereafter with reference to the drawing, which schematically shows an embodiment of the invention.

DESCRIPTION OF THE PREFERRED EMBODIMENT

Figure 1:
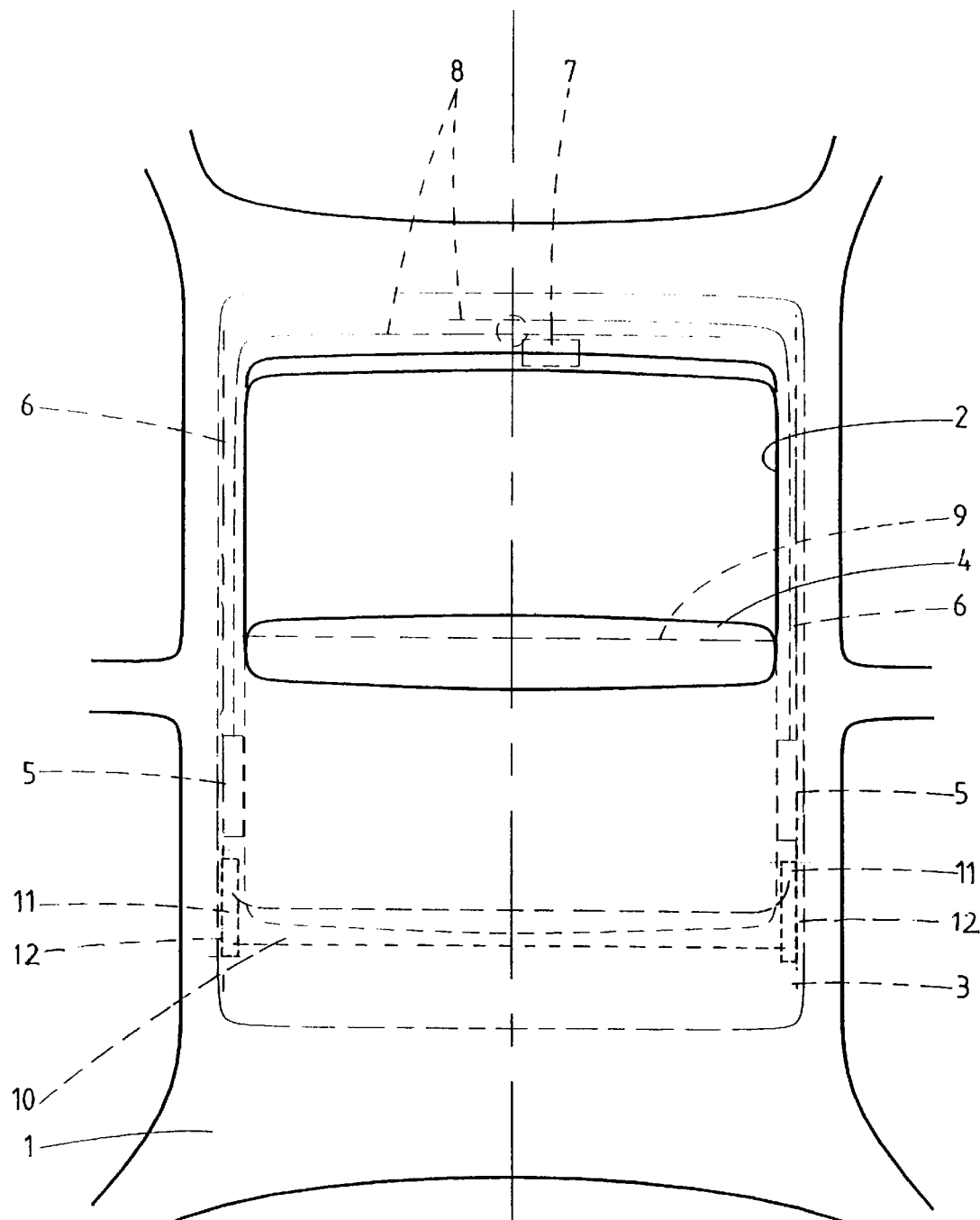
FIG. 1 is a very schematic plan view of a vehicle roof fitted with the embodiment of the open roof construction according to the invention.

FIG. 1 shows the fixed roof 1 of a motor vehicle, in this case a passenger car. Said fixed roof 1 is provided with an opening 2 having an at least substantially rectangular shape, which is provided for the purpose of mounting an open roof construction therein. The open roof construction is provided with a stationary frame 3, which is secured against the underside of fixed roof 1 of the vehicle in this embodiment.

In the illustrated embodiment, the open roof construction is a so-called sliding roof or a tilt-sliding roof, which in this embodiment comprises a more or less rigid, preferably transparent panel 4 as the closing element, which panel is capable of selectively closing roof opening 2 or releasing it to a greater or lesser degree. To this end, panel 4 is laterally supported by mechanisms 5, which are slidably accommodated in guide rails 6 mounted on frame 3 or forming part thereof, which extend in longitudinal direction on either side of roof opening 2 and rearwards thereof, in parallel relationship to each other. Said mechanisms 5 can be moved synchronously in guide rails 6, moving the panel not only in longitudinal direction but also in vertical direction thereby. The mechanisms 5 are to this end operated from a driving device 7, such as an electric motor, for example via pull-push cables 8.

Besides panel 4, the open roof construction also comprises a second closing element in the form of a sun screen 9, which is slidably guided in guide rails 6 with its side edges. Sun screen 9 can be moved forwards or backwards by hand or be carried along by panel 4.

The open roof construction is provided with water drain means which function to catch water that may seep through between panel 4 and roof opening 2, of which means inter alia a transversely extending, movable water gutter 10 is shown in the drawing. Said water gutter is positioned under the rear edge of roof opening 2 in the closed position of panel 4, and it will move along with panel 4 when said panel moves in rearward direction. To this end, water gutter 10 is mounted with its ends on rear slides 11 of the mechanisms 5. Outwardly thereof, or in the outer part of guide rails 6, a respective stationary lateral water gutter 12 is present, above which the respective end of the movable water gutter 10 debouches for draining the water that has been caught in water gutter 10. From said water gutters 12, the water can be drained outside the vehicle, for example via drain pipes and hoses.

Figure 2A:
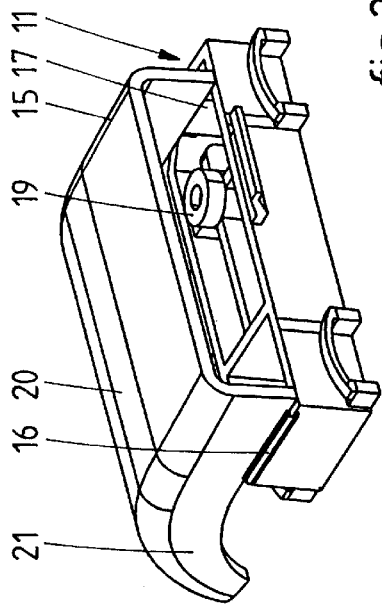
FIGS. 2A and 2B, 3A and 3B are perspective views of a slide with a mounting cover, seen from two sides, showing the mounting cover in open position and in closed position, respectively.
Figure 2B:
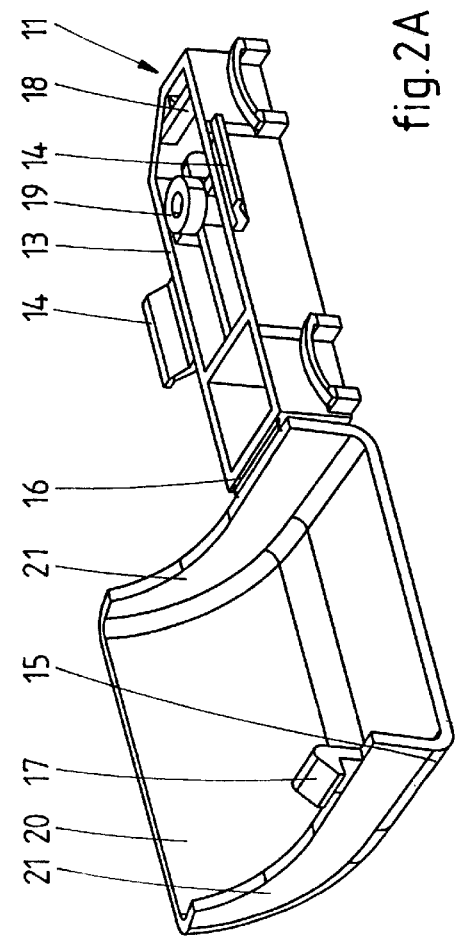
Figure 3A:
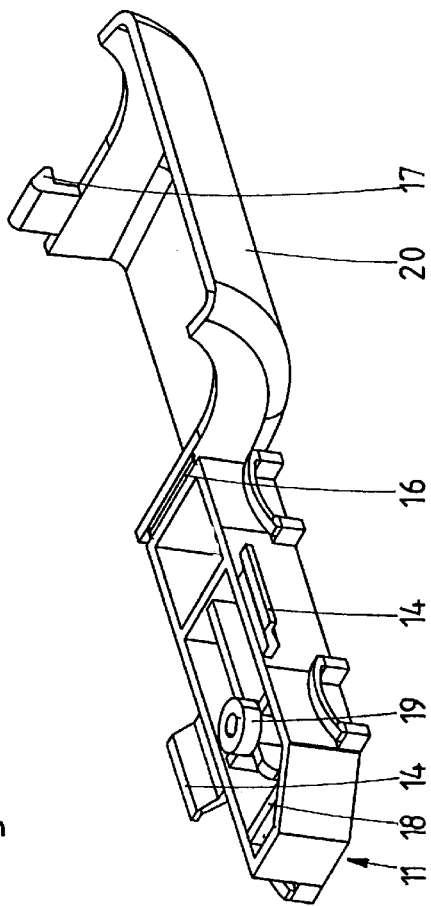
Figure 3B:
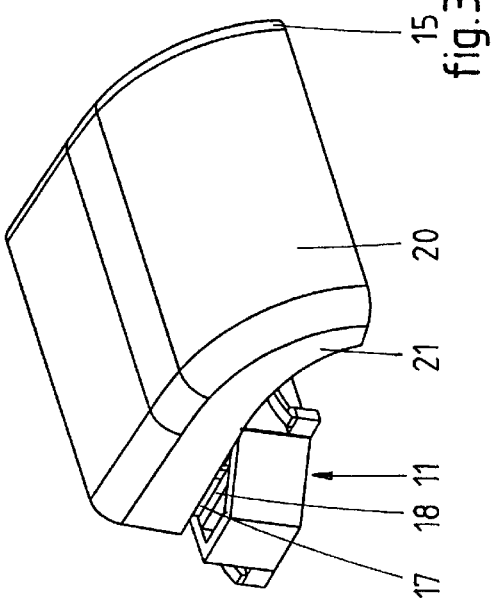

FIGS. 2 and 3 show one of the slides 11 fitted with mounting means for mounting the movable water gutter 10 on slides 11, so that the water gutter will follow the movement of the slides 11.

Each slide 11 comprises a surface, in this case a supporting surface 13 made up of ribs, on which the underside of the respective end of water channel 10 can be supported. A springing lip 14 is present on either side of supporting surface 13 of slide 11, the free end of which lip projects above supporting surface 13 in unloaded condition, so that it is capable of spring-loading water gutter 10 in upward direction in the mounted position of said water gutter on slide 11. Thus, any play in vertical direction is compensated and rattling is prevented.

In order to hold the respective end of water gutter 10 in position on slide 11, slide 11 is provided with a mounting cover 15 which is formed in one piece therewith, which mounting cover is connected to slide 11 via a bending hinge 16 extending in transverse direction on the rear side of slide 11. Mounting cover 15 is fitted with a hook-shaped element 17 on the side opposite hinge 16, which element points downwards in the closed position of mounting cover 15 (FIGS. 2b and 3b), and which is capable of engaging in slide 11 and hooking resiliently behind a rib 18. In this manner a snap connection is realised for holding mounting cover 15 in its closed position on slide 11. In this closed position, mounting cover 15 engages over the respective end of water gutter 10 and retains it in the vertical direction and in the longitudinal direction of the open roof construction. Slide 11 itself may be provided with projections or walls, which co-act with the water gutter 10 for retaining same, for example in the longitudinal direction of the open roof construction, independently of mounting cover 15. Thus, the cylindrical knob 19 projecting in upward direction from supporting surface 13 could fall into a circular recess in the underside of water gutter 10 at one end of the water gutter 10. At the other end of water gutter 10, knob 19 could fall into a slightly elongated, seen in the longitudinal direction of water gutter 10, recess in the underside of water gutter 10, so as to allow relative movement between water gutter 10 and slide 11 in the longitudinal direction of water gutter 10. In this manner knob 19 could also take up forces on water gutter 10 in the longitudinal direction of the open roof construction, although also hinge 16 on the rear side of slide 11 is capable of doing so. Also an upright wall on one side or on both sides of water gutter 10 could function to take up said forces.

From FIGS. 2 and 3 it is furthermore apparent that when water gutter 10 is mounted on each slide 11, mounting cover 15 will extend beyond the respective end of the water gutter, whereby the projecting part of said mounting cover comprises a downwardly curved upper wall 20 and side walls 21 curved downwards along therewith, which together function to conduct water from water gutter 10 into the stationary lateral water gutter 12. In this manner water is prevented from splashing out of water gutter 10, for example across lateral water gutter 12, with sudden movements of the vehicle, for example upon accelerating or braking. Water splashing from water gutter 10 is now urged downwards into water gutter 12 by walls 20 and 21. Thus, the mounting cover 15 is given an additional function.

The upper side of upper wall 20 of mounting cover 15 may also be provided with water conducting means. Said water conducting means function to conduct any water that may land on mounting cover 15 either to the movable water channel 10 or to the lateral water gutter 12. To this end, the water conducting means may be designed as walls or ribs extending in the transverse direction of the open roof construction, between which the water can flow. In that case, the curved upper wall 20 must terminate above or in said lateral water gutter 12, of course.

Slide 11 and mounting cover 15 are so designed that they can be formed by means of an injection moulding technique without any complicated measures being required, so that slide 11 and mounting cover 15 are both easy to fabricate and easy to use.

The invention is not restricted to the above-described embodiment as shown in the drawing, which can be varied in several ways without departing from the scope of the invention. Thus, the invention can also be used with other types of open roof constructions comprising other types of closing elements, such as louvres or divided panels or the like.

I claim:
1. An open roof construction for a vehicle having an opening in its fixed roof, comprising:
    stationary part to be secured to the roof, which is provided with guide rails on either side of the roof opening;
    an adjustable closing element supported by said stationary part, which can be adjusted by mechanisms guided in said guide rails between a closed position, in which it closes the roof opening, and an open position, in which it releases the roof opening, at least partially so;
    a water drain comprising stationary water gutters, which extend parallel to said guide rails, and a moveable water gutter, which is disposed under the rear edge of said closing element, at least in the closed position thereof,
    slides which are slidably guided in said guide rails and each supporting an end of the movable water gutter, said ends are positioned to debouch above the respective stationary water gutter,
    wherein said slides are fitted with mounting covers, which each engage over the respective end of the moveable water gutter, thus holding it in position on said slides.
2. The open roof construction according to claim 1, wherein each mounting cover is hinged to said slide in one piece therewith via a hinge.
3. The open roof construction according to claim 2, wherein the hinge of each mounting cover extends transversely to the guide rails, on the rear side of the water gutter.
4. The open roof construction according to claim 2, wherein each mounting cover is connected to the associated slide by a snap connection on the side opposite the hinge.
5. The open roof construction according to claim 1, wherein each slide is provided with a retaining element for retaining the water gutter in a direction parallel to said guide rails, wherein said retaining element is an upright member.
6. The open roof construction according to claim 1, wherein each slide is provided with at least one springing lip for loading the water gutter in an upward direction into engagement with said mounting cover.
7. The open roof construction according to claim 1, wherein each mounting cover extends beyond the respective end of the water gutter and comprises a water conducting wall.
8. The open roof construction according to claim 7, wherein said water conducting wall comprises an arcuately, downwardly curved wall joining side walls of the mounting cover.
9. An open roof construction for a vehicle having an opening in its fixed roof, comprising:
    a stationary part to be secured to the roof, which is provided with guide rails on either side of the roof opening;
    an adjustable closing element supported by said stationary part, which can be adjusted by mechanisms guided in said guide rails between a closed position, in which it closes the roof opening, and an position, in which it releases the roof opening, at least partially so;
    a water drain comprising stationary water gutters, which extend parallel to said guide rails, and a movable water gutter, which is disposed under the rear edge of said closing element, at least in the closed position thereof;

slides which are slidably guided in said guide rails and each supporting an end of the movable water gutter, said ends are positioned to debouch above the respective stationary water gutter; and a cover engaging over each end of said movable water gutter, which cover is provided with at least one upper water conducting wall for urging water from said water gutter into said stationary water gutters.

10. The open roof construction according to claim 9, wherein said water conducting wall comprises an arcuately, downwardly curved wall joining side walls of the mounting cover.

* * * * *